Oct. 3, 1939.  L. DILLON ET AL  2,174,938
PROCESS FOR DEWAXING OIL
Original Filed July 17, 1933
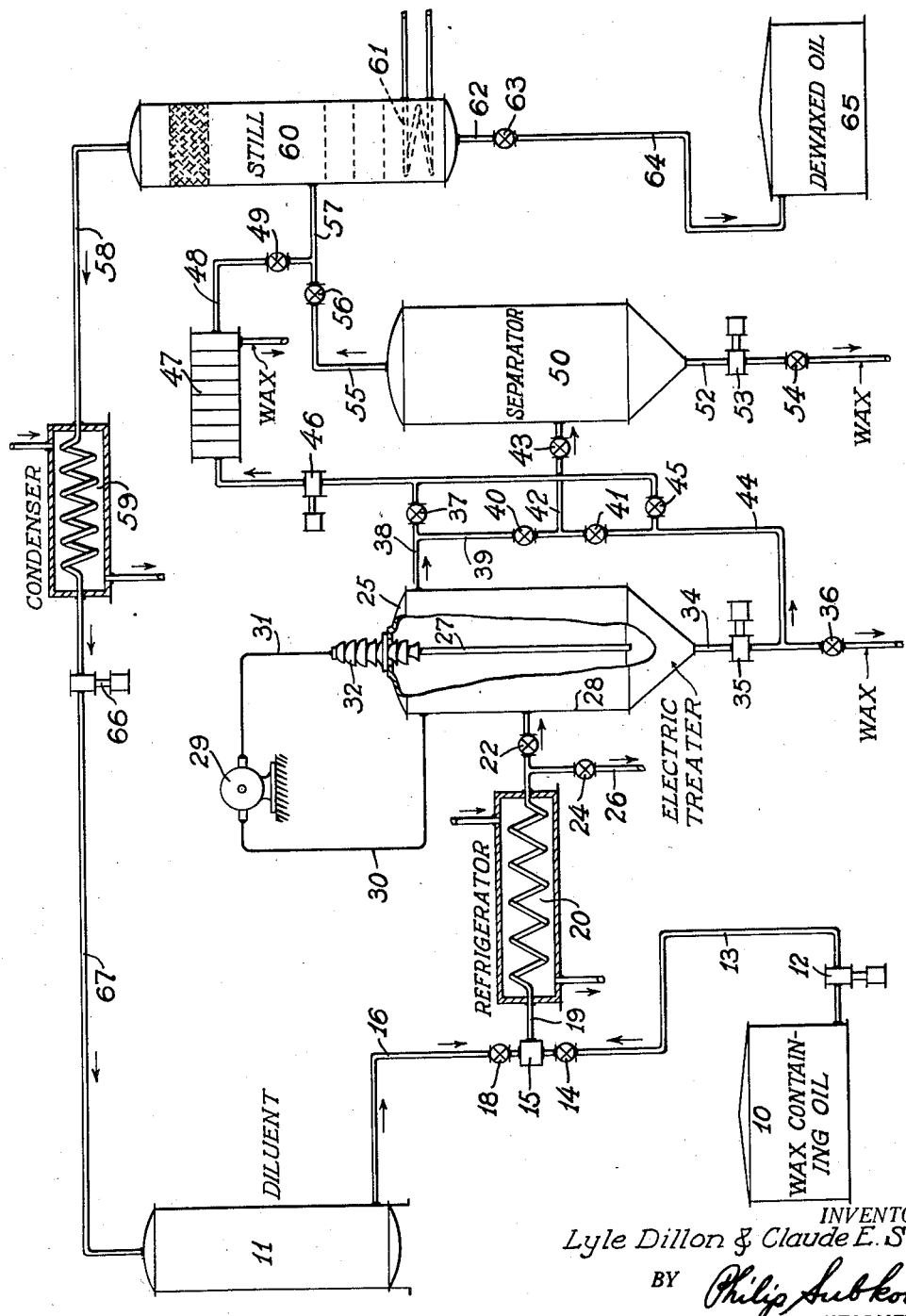
INVENTORS
Lyle Dillon & Claude E. Swift
BY Philip Subkow
ATTORNEY.

Patented Oct. 3, 1939

2,174,938

UNITED STATES PATENT OFFICE 2,174,938

PROCESS FOR DEWAXING OIL

Lyle Dillon and Claude E. Swift, Glendale, Calif., assignors to Union Oil Company of California, Los Angeles, Calif., a corporation of California Original application July 17, 1933, Serial No. 680,710. Divided and this application February 25, 1936, Serial No. 65,627

3 Claims. (Cl. 204—24)

This invention relates to wax separation from wax bearing oil, and is a division of our copending application Serial No. 680,710 which was filed July 17, 1933, and has matured into Patent Number 2,053,552. This invention relates more particularly to the separation of precipitated wax from suspension in oil.

Many crude oils from which lubricating oil is produced contain paraffin or wax. It is found associated with lubricating oil fractions of paraffin base crude oil, asphalt base crude oil and mixtures or blends of lube oil fractions of both paraffin and asphalt base crude oils. The wax is not only of doubtful lubricating value but limits the minimum temperature at which lubricating oils containing it can be used, by congealing at low temperatures. Therefore, in the production of lubricating oil from petroleum fractions containing wax or paraffin, it is customary to remove a substantial portion of the wax or paraffin present in the oil in order to lower its "pour point" or the temperature at which it congeals.

The separation of wax from wax bearing lubricating oil fractions has been accomplished by several processes in the past, the two most common and oldest of which are the "cold settling process" and the "cold pressing process."

In the "cold settling process" the wax-containing oil is first diluted with a quantity of a light hydrocarbon fraction, such as naphtha, gasoline, or kerosene. The diluted wax-containing oil is then slowly chilled by suitable refrigerating means for a period of 20 to 50 hours until a temperature is reached which corresponds to the desired "pour point" and at which a substantial portion of the wax is precipitated. The chilled oil and precipitate mixture is then allowed to stand for a period of several weeks to allow the wax to settle to the bottom of the chilling tank. Objections to this process are the cost of refrigeration for the necessary long periods of time, the large capacity of refrigeration and storage equipment, and the poor separation of wax and oil obtained.

In the "cold pressing" process the wax-containing oil is chilled slowly as in the above described "cold settling" process. The chilled mixture of precipitated wax and oil is then pumped through a filter press under a pressure of 300 to 350 pounds per square inch. The wax precipitate is collected upon the filter and the oil is removed as a pressed distillate relatively free from wax. This process has found commercial application only in conjunction with oil having wax present in a crystalline form. Amorphous and/or micro-crystalline wax has been found extremely difficult and impracticable to separate by filtration methods.

Objects of this invention are to overcome the enumerated disadvantages and other disadvantages of the common wax separation methods, and to provide a novel process for separating wax from oil which will be efficient, economical, of higher capacity, and less costly in time and equipment than the processes heretofore employed.

Other objects are to provide a process for separation of precipitated wax from wax-bearing oil which will be complete, in which the time of settling and separation of the wax is greatly reduced, and in which the time and energy consumption of refrigeration is a minimum, and by which fine precipitates both crystalline and amorphous can be successfully separated. Another object of this invention is to provide a method wherein wax can be separated from wax-bearing oil which has been quickly cooled or "shock chilled." Another object of the invention is to provide a process employing electrical treatment of the wax-bearing oil wherein the rate of cooling of the said wax-bearing oil can be greatly increased and the time for settling and separation greatly reduced.

In general these objects are attained according to the invention through treating the mixture of oil and precipitated wax by electrical field or current.

The invention is embodied in apparatus capable of performing a process comprising chilling a wax-bearing oil or a solution of such an oil in a suitable diluent to a temperature at which wax precipitation therein takes place, subjecting the diluent, oil and wax precipitate solution or mixture to an electric field or electric current to aid separation, and depositing and settling, filtering and/or centrifuging the thus treated oil to further separate the wax therefrom.

The invention broadly stated comprises a method of treating wax-bearing oil with an electric field or current to aid separation of wax therefrom. The invention more specifically stated comprises a process for treating wax-bearing oil and/or wax-bearing oil containing precipitated wax, by an electrical field or current to aid in separation and deposition of the precipitated wax, to reduce the time of chilling and settling and to increase the efficiency and completeness of separation by subsequent separating methods.

Other objects and advantages and features of the invention will be evident hereinafter.

The accompanying drawing illustrates one embodiment of the invention.

Wax-bearing oil at a temperature above that at which wax is precipitated from solution is stored in tank 10. This oil is withdrawn from the tank 10 by pump 12 and forced through line 13 and valve 14 to a mixer 15 where it meets and dissolves in a stream of a light hydrocarbon diluent supplied through line 16 and valve 18 from diluent storage tank 11. The solution of wax-containing oil and diluent passes from mixer 15 through line 19 into refrigerator 20 where it is chilled to a temperature at which a substantial amount of wax is precipitated from solution. The mixture of wax-bearing oil, diluent and precipitate flows through valve 22 into the treater chamber 25 where it is subjected to an electric field. The electric treating field is established between a central electrode 27 and the treater chamber wall 28, the electrical potential therefor being supplied by generator 29. Suitable electrical connections 30 and 31 are provided from generator 29 to the said central electrode through high tension lead-in insulator 32 to the treater wall.

The wax precipitate which settles to the bottom of treater chamber 25 may be withdrawn through outlet 34 by means of pump 35 and expelled through valve 36. The solution from which a portion of wax has thus been removed is decanted from the top portion of the treater chamber through line 38 and allowed to flow through line 39, valve 40, line 42 and valve 43 into a separating tank 50 where a substantial portion of the remaining precipitated wax is allowed to settle out. The wax which settles to the bottom of settling tank 50 is withdrawn through outlet 52 by means of pump 53 and expelled through valve 54.

The solution from which the wax has been separated is withdrawn from the top of the settling tank 50 through line 55, valve 56 and introduced into still 66 through line 57 where the diluent is distilled from the oil.

Heat for distillation is supplied by means of heating coil 61.

The oil bottoms from which the diluent has been distilled is withdrawn from still 66 through outlet valve 63 and run to the dewaxed oil storage tank 65 through line 64.

The vapors from the top of still 66 are withdrawn through vapor line 58 and condensed in condenser 59 and the condensate returned by means of pump 60 through line 61 to the diluent storage tank 11.

In some cases it is desirable instead of expelling the settlings from the treater chamber 25 through valve 36 to run it to the separator 50 for further settling and separation. In this case, valves 36, 40 and 45 are closed and valve 43 opened and the said settlings are forced by means of pump 35 through line 44, valve 41, line 42 and valve 43 into the separator 50. The solution from which the wax has been partially removed may then be withdrawn from the top of the treater chamber 25 through outlet 38, valve 37 and forced by means of pump 46 to a filter press 47. The filtrate from filter press 47 may be introduced into the still 66 through line 48, valve 49 and inlet 57. A centrifuge or any other means for separating precipitated wax may be substituted for the filter press 47 if desired.

In some cases it is also desirable to run the wax precipitate settlings from treater chamber 25 to the filter press 47 and this is accomplished by closing valves 36, 37 and 41 and forcing said settlings by means of pump 35 through line 44 and valve 45 to pump 46 and from there to said filter press 47. Recirculation of the solution in treater chamber 25 may be accomplished with pump 35 by closing valves 37, 43 and 45 and opening valves 40 and 41.

A battery of electric treater chambers, such as illustrated in the drawing by numeral 25, may be employed in parallel and valve 24 and branch line 26 from the refrigerator 20 are provided for making connection with them. With this arrangement the operation of the electric treating chambers may be alternated to allow the precipitated wax, which has accumulated upon the electrode and the treater chamber surfaces, to be removed and the inside of the chamber thoroughly cleaned. For continuous operation suitable mechanical means, such as scrapers, may be employed for removing deposited wax from the electrode and the chamber surfaces.

As an example of the operation of this method of dewaxing oil a 27% solution of wax in a light hydrocarbon was chilled to a temperature at which a substantial portion of this wax was precipitated from solution and the resulting mixture was treated by a high potential direct current for a period of fifteen minutes. At the end of this time the electrodes were found to be heavily coated with precipitated wax. It has been found that the portion of the wax which is not deposited on the electrodes during electrical treatment is agglomerated and the precipitate thus treated is in a form which can be much more readily settled or otherwise separated as by filtration or centrifuging.

It is desirable in some cases to dilute the wax-bearing oil with a diluent, chill the solution to a point where wax precipitates from solution, separate a portion of the wax from the chilled solution by settling and subsequently treat the chilled solution electrically to separate the remaining wax not removed by the prior settling.

Naphtha, gasoline, liquid propane, acetone and benzol, methyl chloride, halogenated hydrocarbons, such as monochloro-difluoro methane, dichloro-difluoro methane, dichlorethylene, trichlorethylene, or ethers or mixtures of ethers and alcohols may be employed as diluents for the wax-bearing oil.

Potential gradients of 5,000 to 35,000 volts per inch either continuous or interrupted direct current through the solution have been found effective in agglomerating and depositing the precipitated wax. Some waxes appear to be negatively charged and to show a tendency to deposit most heavily on the positive electrode. When it is desired to agglomerate the wax particles without deposition, to aid settling and separation or filtering or centrifuging, an alternating potential is effective.

An advantage of the present process is that the oil solution containing wax can be shock chilled and by means of electrical treatment good separation and settling obtained. Heretofore with conventional methods of wax separation, very slow cooling of the waxy solution over long periods of time was required.

The process is not limited to the treatment of wax but is applicable to asphalt, asphaltines, petrolatum, sludges and other substances both solid and plastic.

It is to be understood that the foregoing is merely illustrative of one apparatus and method and that the invention is not limited thereby but may include any method and apparatus which accomplishes the same within the scope of the invention.

We claim:

1. A process for the separation of wax from a wax-bearing oil which comprises shock chilling said oil to precipitate wax, subjecting the chilled oil containing precipitated wax to the influence of an electric field between electrode surfaces immersed therein to form wax which is readily separable in character and separating the wax from the chilled mixture by electro-deposition upon an immersed electrode surface in said chilled mixture.

2. A process for the separation of wax from wax-bearing oil which comprises quickly cooling and thereby shock chilling wax-bearing oil to precipitate the wax therein, subjecting the thus chilled oil and wax mixture to the influence of an electric field between electrodes, and separating the wax from the chilled mixture by electro-deposition upon an electrode.

3. A process for the separation of wax from wax-bearing oil which comprises "shock chilling" said oil by quickly cooling the oil, thereby precipitating wax in the oil, subjecting the chilled oil containing the precipitated wax to the influence of an electric field between electrodes to modify the form of the wax, and separating the wax from the chilled mixture by electro-deposition upon an electrode while under the influence of an electric field.

LYLE DILLON.
CLAUDE E. SWIFT.